(12) United States Patent
Wallace et al.

(10) Patent No.: US 11,193,523 B2
(45) Date of Patent: Dec. 7, 2021

(54) DIRECT TENSION INDICATING WASHER WITH ENHANCED INDICATING MATERIAL AND METHOD OF MANUFACTURING

(71) Applicant: Applied Bolting Technology, Bellows Falls, VT (US)

(72) Inventors: Kristyn Joelle Wallace, Walpole, NH (US); Robert David Westover, Walpole, NH (US); Jordan David Richardson, Walpole, NH (US)

(73) Assignee: APPLIED BOLTING TECHNOLOGY, Bellows Falls, VT (US)

( * ) Notice: Subject to any disclaimer, the term of this patent is extended or adjusted under 35 U.S.C. 154(b) by 63 days.

(21) Appl. No.: 14/622,992

(22) Filed: Feb. 16, 2015

(65) Prior Publication Data

US 2015/0330432 A1    Nov. 19, 2015

Related U.S. Application Data

(60) Provisional application No. 61/994,242, filed on May 16, 2014.

(51) Int. Cl.
  *F16B 31/00*  (2006.01)
  *F16B 31/02*  (2006.01)
  *F16B 43/00*  (2006.01)
  *B05D 3/00*   (2006.01)
  *B05D 3/12*   (2006.01)

(52) U.S. Cl.
  CPC ............ *F16B 31/028* (2013.01); *B05D 3/002* (2013.01); *B05D 3/007* (2013.01); *B05D 3/12* (2013.01); *F16B 43/00* (2013.01)

(58) Field of Classification Search
  CPC ............................. F16B 1/0071; F16B 31/028
  USPC ............................................................ 411/13
  See application file for complete search history.

(56) References Cited

U.S. PATENT DOCUMENTS

| 3,304,827 | A | * | 2/1967 | Bush | F16B 39/24 411/13 |
| 4,645,816 | A | * | 2/1987 | Pohl | C08G 18/10 528/28 |
| 5,088,867 | A | * | 2/1992 | Mun | F16B 19/04 116/212 |
| 5,320,250 | A | | 6/1994 | La et al. | |
| 5,746,555 | A | * | 5/1998 | McEvoy | E04C 5/165 403/307 |

(Continued)

FOREIGN PATENT DOCUMENTS

| FR | 2955366 A1 | 7/2011 |
| WO | 2013169639 A1 | 11/2013 |

OTHER PUBLICATIONS

International Search Report for application PCT/US2015/029153, dated Jul. 29, 2015, 5 pages.

(Continued)

*Primary Examiner* — Flemming Saether
(74) *Attorney, Agent, or Firm* — Cantor Colburn LLP

(57) ABSTRACT

A direct tension indicating washer includes a first surface having a protuberance formed thereon; a second surface having an indentation formed opposite the protuberance; an indicating material positioned in the indentation; and a channel leading from the indentation to an outer diameter of the direct tension indicating washer; wherein the indicating material is weather-resistant.

3 Claims, 3 Drawing Sheets

(56) References Cited

U.S. PATENT DOCUMENTS

| | | | |
|---|---|---|---|
| 5,769,581 A | 6/1998 | Wallace et al. | |
| 5,931,618 A | 8/1999 | Wallace et al. | |
| 5,934,852 A * | 8/1999 | Stingl | F16B 1/0071 411/13 |
| 6,425,718 B1 | 7/2002 | Herr et al. | |
| 6,729,819 B2 | 5/2004 | Wallace | |
| 7,021,153 B2 * | 4/2006 | Almanstoetter | F16B 1/0071 73/761 |
| 7,857,562 B2 | 12/2010 | Wallace | |
| 8,002,641 B2 | 8/2011 | Wallace | |
| 8,382,409 B2 | 2/2013 | Wallace | |
| 8,696,275 B2 | 4/2014 | Wallace et al. | |
| 2002/0009594 A1 | 1/2002 | Smith et al. | |
| 2008/0138167 A1 | 6/2008 | Wallace | |
| 2008/0260496 A1* | 10/2008 | Parmann | F16B 1/0071 411/439 |
| 2011/0123288 A1 | 5/2011 | Wallace | |
| 2013/0170924 A1 | 7/2013 | Wallace et al. | |
| 2013/0322988 A1 | 12/2013 | Handa | |

OTHER PUBLICATIONS

Written Opinion for application PCT/US2015/029153, dated Jul. 29, 2015, 4 pages.

\* cited by examiner

DIRECT TENSION INDICATING WASHER WITH ENHANCED INDICATING MATERIAL AND METHOD OF MANUFACTURING

CROSS-REFERENCE TO RELATED APPLICATION

This application claims the benefit of U.S. provisional patent application Ser. No. 61/994,242, filed May 16, 2014, the entire contents of which are incorporated herein by reference.

BACKGROUND

Embodiments relate in general to direct tension indicating washers and in particular to a direct tension indicating washer with enhanced indicating material and a method of manufacturing.

Direct tension indicating washers are used to indicate when proper bolt tension has been reached. U.S. Pat. No. 5,931,618, the entire contents of which are incorporated herein by reference, discloses an exemplary direct tension indicating washer. FIG. 1 is a top view of the direct tension indicating washer from U.S. Pat. No. 5,931,618. FIG. 2 is a cross-sectional view taken along line 2-2 of FIG. 1. Direct tension indicating washer 60 includes protuberances 12 formed on a first surface 14 and corresponding indentations 16 formed on a second surface 18. The direct tension indicating washer 60 includes channels 62 in bottom surface 18 that lead from each indentation 16 to the outer diameter of the direct tension indicating washer 60. The indentation 16 is filled with an indicating material 64. When direct tension indicating washer 60 is used with a bolt, protuberances 12 are compressed as the bolt is tensioned. When the desired bolt tension is achieved, indicating material 64 emerges from channel 62 at the outer diameter of direct tension indicating washer 60. The emission of the indicating material provides a visual indicator that the bolt has been properly tensioned.

One issue with existing direct tension indicating washers is that the indicating material can become granulated and wear away in the presence of environmental conditions, such as wind, rain, etc. An installer may visually confirm proper bolt tension upon installation, but a subsequent visitor (e.g., an inspector) will not see the indicating material. The inspector must use a feeler gauge to confirm proper bolt tension, which is a more laborious process than a visual inspection.

BRIEF DESCRIPTION OF THE DRAWINGS

Referring now to the drawings wherein like elements are numbered alike in the several Figures.

DETAILED DESCRIPTION

Figure 1:
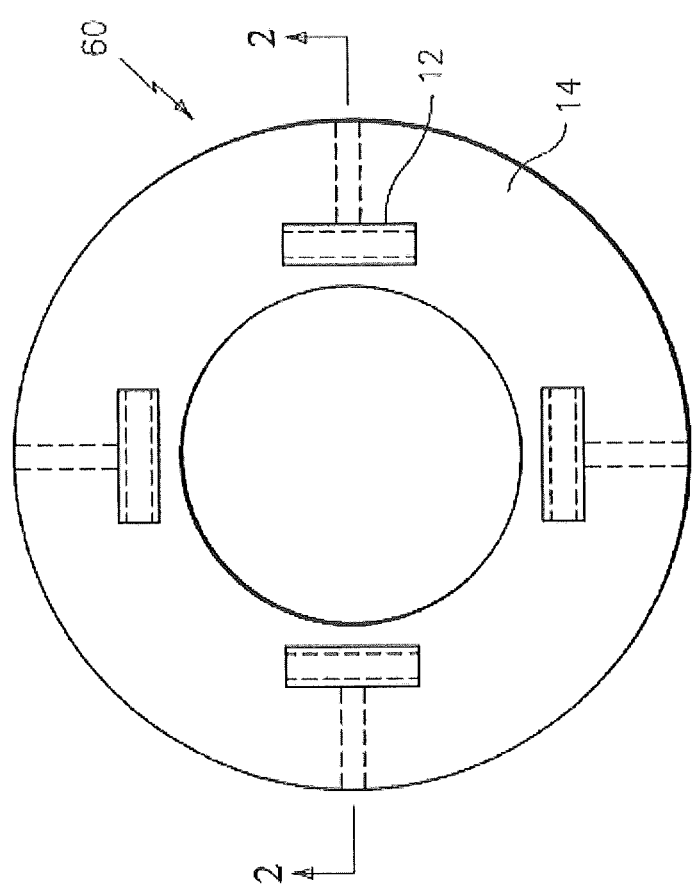
FIG. 1 is a top view of a conventional direct tension indicating washer.
Figure 2:
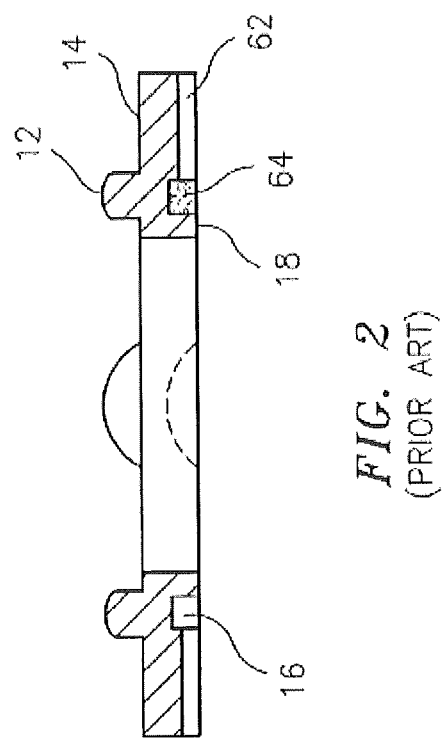
FIG. 2 is a cross-sectional view of the direct tension indicating washer shown in FIG. 1 taken along line 2-2.

Exemplary embodiments employ a weather-resistant indicating material 64. The weather-resistant indicating material remains visible (e.g., on the supporting structure and/or in the distal end of channel 62) for a longer period of time and thereby allows visual confirmation that proper bolt tension was achieved at installation. The indicating material may be selected to have a rheology and a tear resistance, which allows the indicating material 64 to extrude smoothly from channel 62 without crumbling. This results in less damage to the indicating material 64 when it is emitted through channel 62, giving the indicating material 64 better strength to resist dislodging from the supporting structure and/or channel 62 in the presence of wind, rain, etc.

Any suitable thermoplastic or thermoset may be used for the indicating material 64, so long as it has suitable weather-resistant properties. Representative thermoset materials include one or more epoxides, phenolics, melamines, ureas, polyurethanes, polysiloxanes, or polymers including a suitable crosslinkable functional moiety.

Illustrative examples of thermoplastic polymeric materials include one or more of olefin-derived polymers, for example, polyethylene, polypropylene, and their copolymers; polymethylpentene-derived polymers, for example, polybutadiene, polyisoprene, and their copolymers; polymers of unsaturated carboxylic acids and their functional derivatives, for example, acrylic polymers such as poly (alkyl acrylates), poly (alkyl methacrylate), polyacrylamides, polyacrylonitrile, and polyacrylic acid; alkenylaromatic polymers, for example polystyrene, poly-alpha-methylstyrene, polyvinyltoluene, and rubber-modified polystyrenes; polyamides, for example, nylon-6, nylon-66, nylon-11, and nylon-12; polyesters, such as, poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly (cyclohexanedimethanol terephthalate), poly (cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and poly(alkylene arenedioates); polycarbonates; co-polycarbonates; co-polyestercarbonates; polysulfones; polyimides; polyarylene sulfides; polysulfide sulfones; and polyethers such as polyarylene ethers, polyphenylene ethers, polyethersulfones, polyetherimides, polyetherketones, polyetheretherketone; or blends or copolymers thereof.

Silane end-capped polyether compositions, specifically methoxy silane end-capped polyether compositions, are specifically mentioned. Such materials can provide a desirable combination of weather-resistance, rheology, and tear resistance. For example, reacting terminal isocyanate groups of a polyurethane with a silane monomer having at least one dialkoxy silane group and an organofunctional group can provide a material having improved elongation, flexibility, and modulus. Such materials are disclosed in U.S. Pat. No. 4,645,816, the content of which is incorporated herein by reference in its entirety.

In other embodiments, the indicating material 64 may be implemented using urethane and other polyurethane based adhesives, methacrylate adhesives, ethylene-vinyl acetate copolymers including ethylene-acrylates, other polyolefins including polybutene and amorphous polyolefin, polyamides and polyesters, styrene block copolymers, polycarbonates, silicone rubbers as well as other thermoplastic elastomers.

The weather resistance of the indicating material can be evaluated by measurement of the impact strength, either by notched charpy impact strength in accordance with ASTM A370, or by Izod impact strength according to ASTM D256 before and after weathering testing (e.g. QUV) treatment in accordance with ASTM G154, the contents of which are incorporated herein by reference in their entirety. To evaluate weather resistance, 10 mm×10 mm×55 mm samples of the indicating material are treated by weathering testing for 500 hours using a cycle of 8 hours UV exposure at 70° C. followed by 4 hours of condensation at 50° C. Suitable indicating materials include those having a change in impact strength after weathering by weathering testing for 500 hours of less than 50%, specifically less than 25%, more specifically less than 10%, or 0.001 to 50%, or 0.001 to 25%. In an embodiment the indicating material has a change in impact strength after treatment by weathering testing for 500 hours using a cycle of 8 hours UV exposure at 70° C. followed by 4 hours of condensation at 50° C. of less than 50% when impact strength is determined as Izod impact strength according to ASTM D256.

Figure 3:
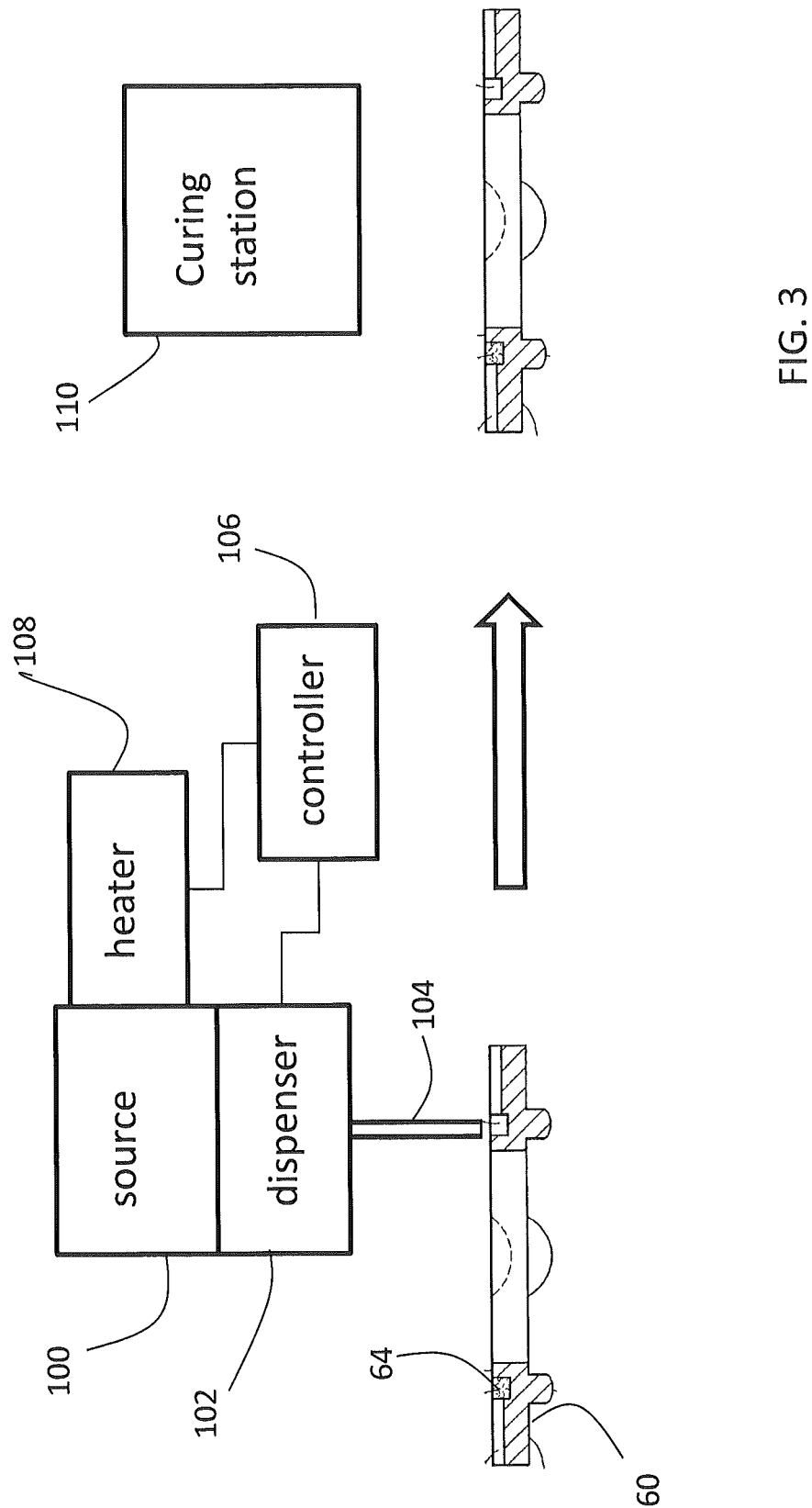
FIG. 3 depicts manufacturing in an exemplary embodiment.

In addition to enhanced indicating material, embodiments include methods for manufacturing direct tension indicating washer 60. FIG. 3 depicts portions of an exemplary manufacturing process. It is understood that the entire manufacturing process is not illustrated.

Once the protuberances 12, indentations 16 and channels 62 are formed in the direct tension indicating washer 60 (e.g., by stamping), the indication material is placed in the indentations 16. Prior machinery for applying the indicating material did not provide precise control of the amount of indicating material applied to each indentation 16. Also, the prior applicator would allow indicating material to drip from the applicator, causing variation in the amount of indicating material dispensed in the indentation.

The system of FIG. 3 uses a positive pressure, volumetric dispensing system that imparts a mechanical shock to the indicating material, causing a shearing or rupturing within the indicating material upon dispensing. The dispensing system eliminates dripping by firing the indicating material droplet aggressively from a dispense needle with increased velocity. As shown in FIG. 3, a source 100 of indicating material may be in the form of a cartridge, hopper, vat, etc. Indicating material in source 100 is uncured. A dispenser 102 is coupled to the source 100 and emits a drop of indicating material 64 into indentation 16. Dispenser 102 may use a pump or other positive pressure source to eject the indicating material 64. A needle 104 is coupled to the dispenser 102 to direct the indicating material 64 into the indention 16. A controller 106 controls operation of dispenser 102, to ensure that indicating material is ejected at proper times.

The increased dispense velocity of the indicating material causes the indicating material to impact into the indentation and lay out. This prevents mounding due to surface tension and viscosity of the indicating material. Additionally, without dripping of indicating material from the needle 104, the production rate is increased by decreasing the time the dispenser 102 needs to wait until it can move to the next location. Another benefit correlates to the volumetric nature of the dispensing system. The amount of indicating material 64 in each indentation 16 is controlled more precisely. This results in better performing direct tension indicating washers due to increased consistency and/or reduced scatter of the indicated tension across many direct tension indicating washers. This allows the tension at which the indicating material is emitted to be closer to the targeted bolt tension without the risk of the indicating material being emitted after the desired bolt tension has been achieved.

Another feature of the dispensing system of FIG. 3 is the use of a heater 108 to control the viscosity of the indicating material in its un-cured and un-dispensed state in source 100. Heater 108 may be positioned inside or outside of source 100. Controlling the viscosity of the uncured indicating material allows the dispensing system to use indicating materials that would be impractical to pump or dispense with at the required volumes and tolerances (e.g. microgram). Controller 106 controls heater 108 to maintain the indicating material in source 100 at a desired temperature to achieve a desired viscosity. Controlling the viscosity of the indicating material in source 100 also reduces the time it takes to manufacture a part as well as extending the flow and settling within the indentation 16.

Another feature of the dispensing system of FIG. 3 is the use of accelerated curing techniques (e.g., heat, humidity and/or UV exposure) after the indicating material 64 is dispensed in the indentations 16. As shown in FIG. 3, a curing station 110 is used to cure the indicating material 64. This reduces the natural curing time of the indicating material 64. This is particularly helpful for more durable indicating materials where the exterior skin formed will naturally protect the core of uncured squirt media. The acceleration of curing reduces the time delay in process control feedback and reduces out of control production. Accelerated curing also enables faster packaging and delivery of product than what would be possible using air curing of the indicating material.

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A direct tension indicating washer comprising:
   a first surface having a protuberance formed thereon;
   a second surface having an indentation formed opposite the protuberance;
   an indicating material positioned in the indentation; and
   a channel leading from the indentation to an outer diameter of the direct tension indicating washer;
   wherein the indicating material is weather-resistant;
   wherein the indicating material has a change in impact strength of less than 50% after treatment by weathering testing for 500 hours using a cycle of 8 hours UV exposure at 70° C. followed by 4 hours of condensation at 50° C.;
   wherein the indicating material is configured to emerge from the channel at the outer diameter of the direct tension indicating washer in response to compression of the protuberance due to tension on a bolt about which the direct tension indicating washer is installed.

2. The direct tension indicating washer of claim 1, wherein the indicating material has a change in impact strength after treatment by weathering testing of 0.001% to 25%.

3. The direct tension indicating washer of claim 1, wherein the indicating material has a change in impact strength after treatment by weathering testing of 0.001% to 10%.

\* \* \* \* \*